United States Patent [19]

Bernstein et al.

[11] Patent Number: 5,543,116
[45] Date of Patent: Aug. 6, 1996

[54] METHOD FOR REDUCING $NO_x$ USING ATOMIZING STEAM INJECTION CONTROL

[75] Inventors: Gary S. Bernstein, Wadsworth; Thomas K. Milo, Akron, both of Ohio

[73] Assignee: The Babcock & Wilcox Company, New Orleans, La.

[21] Appl. No.: 275,870

[22] Filed: Jul. 15, 1994

[51] Int. Cl.[6] .................................................. B01D 53/56
[52] U.S. Cl. ............................ 422/111; 110/343; 422/168
[58] Field of Search ..................................... 422/108, 111, 422/168; 110/343, 345; 122/4 D; 431/62, 10

[56] References Cited

U.S. PATENT DOCUMENTS

| | | | |
|---|---|---|---|
| 4,412,808 | 11/1983 | Sheppard et al. | 431/8 |
| 4,505,665 | 3/1985 | Mansour | 431/10 |
| 4,618,323 | 10/1986 | Mansour | 431/10 |
| 5,308,239 | 5/1994 | Bazarian et al. | 431/10 |

OTHER PUBLICATIONS

Bailey Product Catalog E 92. 530–1, 1993.
B&W Field Service Engineering Report, Jan. 7, 1994.
Colannino, Joseph, "Low–Cost Techniques, Reduce Boiler $NO_x$", Chemical Engineering, Feb. 1993, pp. 100–106.

*Primary Examiner*—Timothy M. McMahon
*Attorney, Agent, or Firm*—Daniel S. Kalka; Robert J. Edwards

[57] ABSTRACT

A method and apparatus for controlling $NO_x$ produced by a natural gas fired combustion source includes establishing a control curve for the combustion source for indicating $NO_x$ levels based on steam injection rates and fuel flow rates provided to the burners. The atomizing steam injection flow rate provided to the burner is measured as well as the fuel flow rate. A $NO_x$ level is determined for the combustion source based on the atomizing steam injection flow rate, the firing rate, and the fuel flow rate. $NO_x$ levels are lowered by adding atomized steam to the burners according to the pre-programmed control curve.

7 Claims, 11 Drawing Sheets

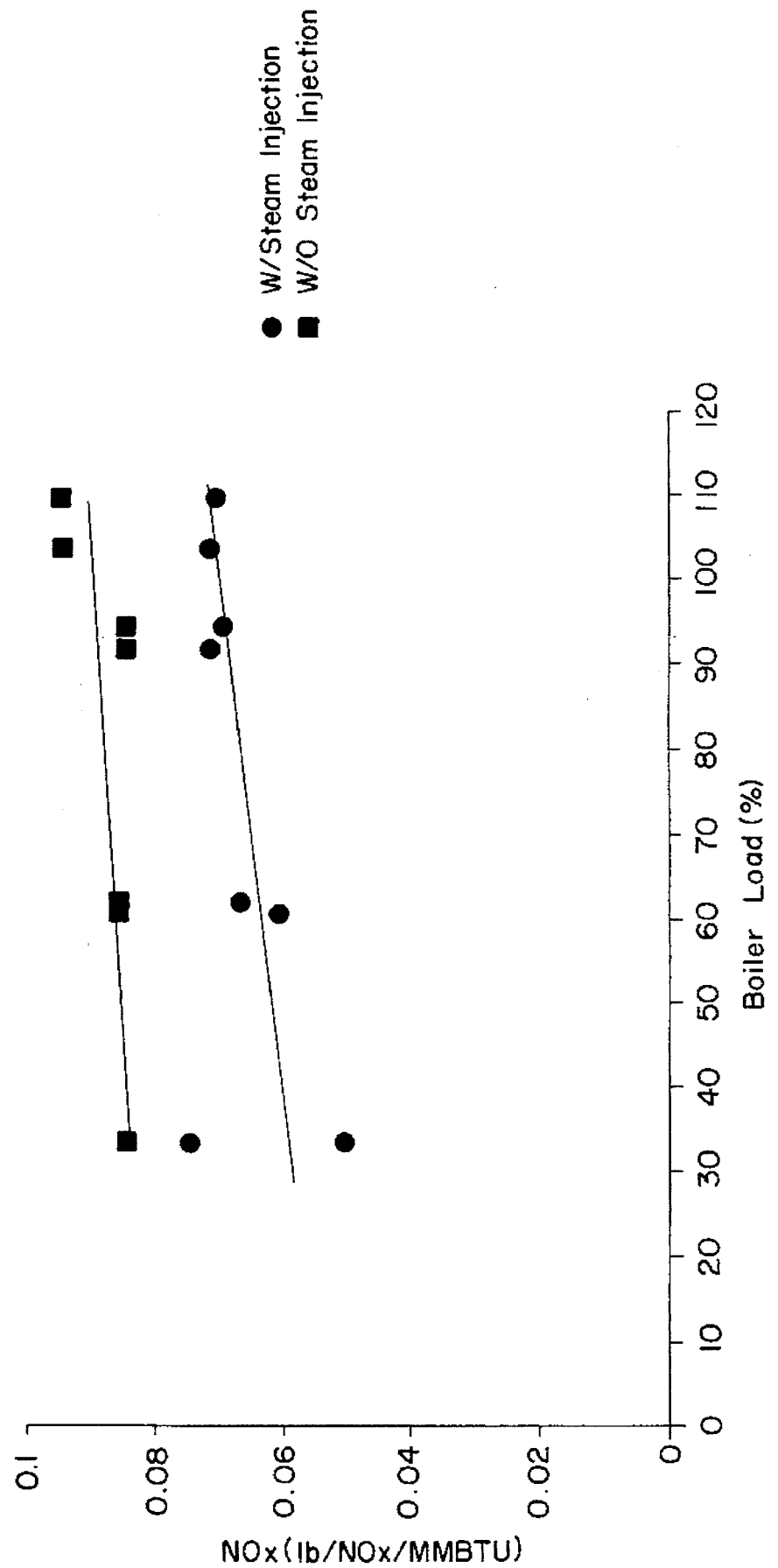

METHOD FOR REDUCING $NO_x$ USING ATOMIZING STEAM INJECTION CONTROL

BACKGROUND OF THE INVENTION

1. FIELD OF THE INVENTION

The present invention relates, in general, to the reduction of $NO_x$ emissions and, in particular, to a new and useful apparatus and method for reducing $NO_x$ levels in a boiler such as a fuel-fired package boiler using atomizing steam injection according to a pre-programmed $NO_x$ control curve.

2. DESCRIPTION OF THE RELATED ART

In the gas turbine industry, it is well-known that steam injection reduces $NO_x$ levels produced by gas-fired units. Steam injection is a widely accepted and well-proven technology for achieving $NO_x$ reduction.

However, with respect to natural gas-fired boilers, no adequate control systems and methods which include atomizing steam rates have been established to the inventors' knowledge.

SUMMARY OF THE INVENTION

The present invention is directed to an apparatus and a method for controlling $NO_x$ emissions produced by a natural gas-fired combustion source such as a boiler. The method comprises establishing a control curve for the boiler which indicates $NO_x$ emission levels based on atomizing steam injection rates and fuel flow rates which are provided to the burners of the boiler. The fuel flow provided to the burners is monitored and measured. The atomizing steam injection flow produced by the boiler or some other suitable steam source is also monitored and measured. A controller, such as a programmable loop commander master controller, contains the pre-established control curve which determines or calculates the desired $NO_x$ level for the boiler based on the measured atomizing steam injection flow, the measured fuel flow, and the firing rate of the burners. The controller controls the atomizing steam injection's output from an atomizing steam characterizable control valve for adding atomized steam into the burner zone in order to lower the $NO_x$ level according to the pre-programmed control curve.

The measured atomizing steam injection flow rate, the measured fuel flow rate, and the $NO_x$ levels are recorded by a recorder.

It is an object of the present invention to provide a method and apparatus for controlling $NO_x$ emission levels produced by a natural gas-fired boiler utilizing atomizing steam injection according to a pre-established control curve.

It is another object of the present invention to provide a method and apparatus for controlling $NO_x$ levels for a natural gas-fired package boiler which is more cost efficient over other known methods and systems.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a graph illustrating test results for a fuel fired boiler with steam injection and without steam injection;

DESCRIPTION OF THE PREFERRED EMBODIMENT

Figure 1:
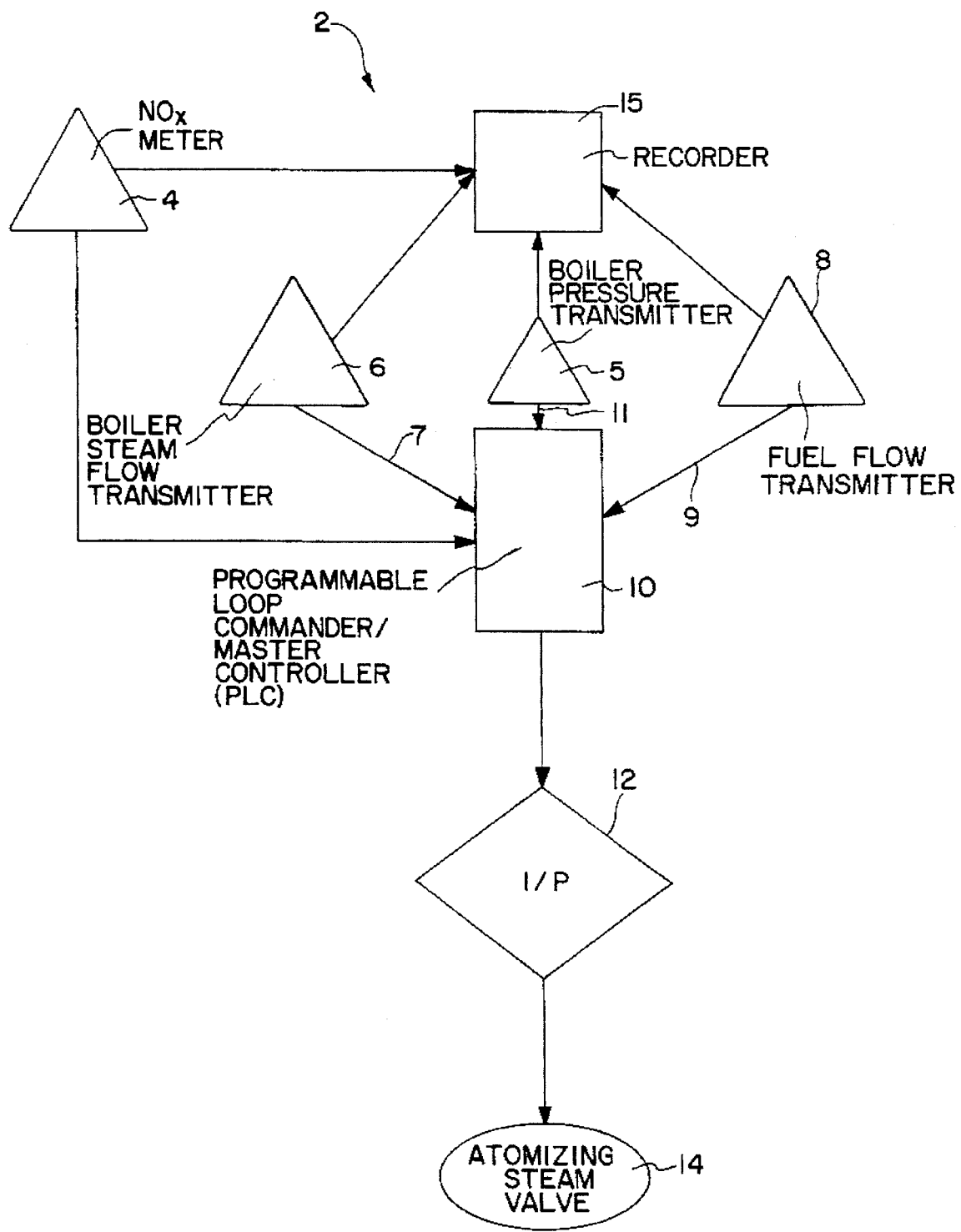
FIG. 1 is a logic diagram illustrating a method and apparatus for controlling $NO_x$ emission levels according to the present invention.
Figure 4:
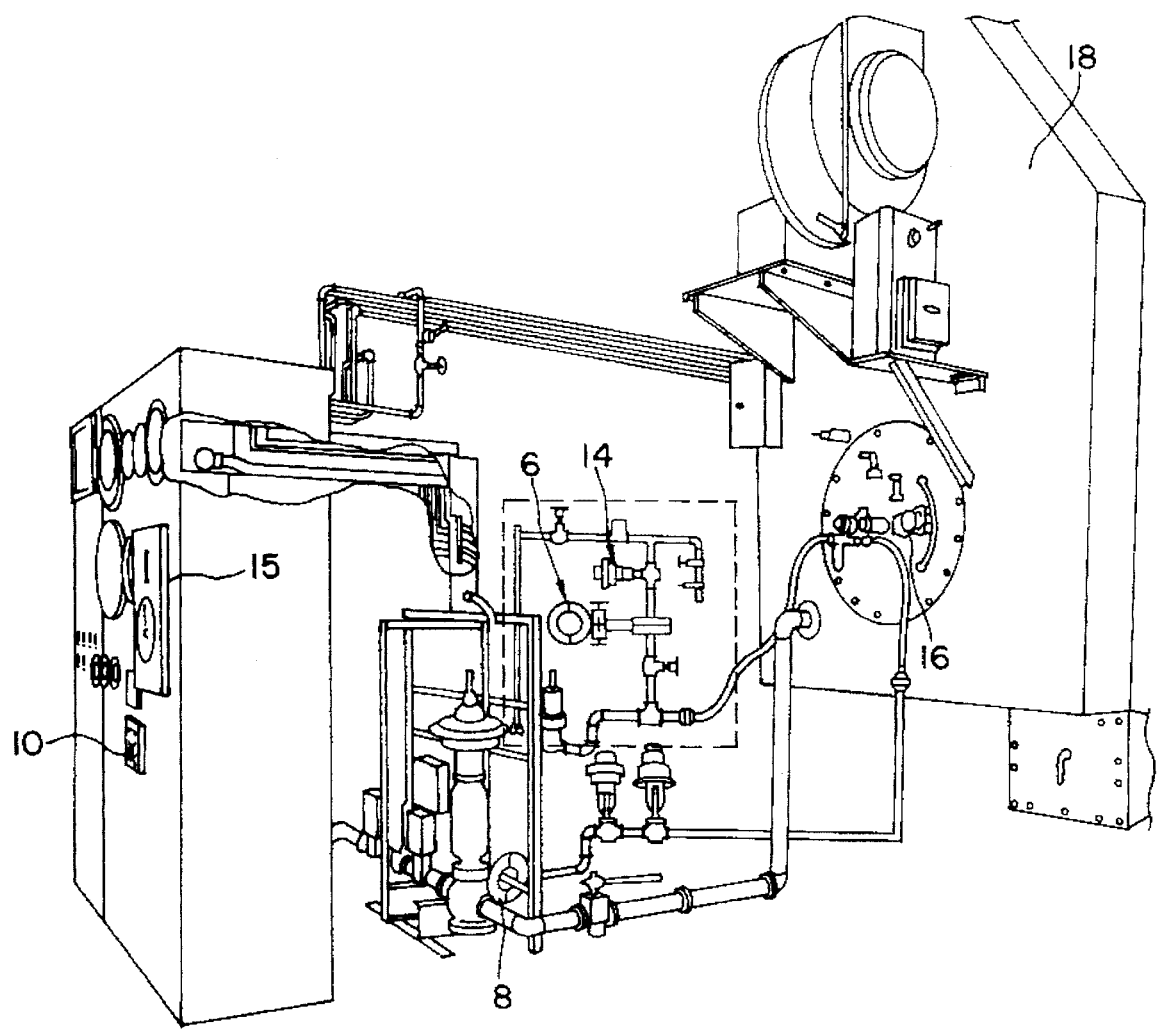
FIG. 4 is a schematic view illustrating the hardware used for the $NO_x$ control method according to one embodiment of the present invention.

Referring to FIG. 1, the present invention is a control system, generally designated 2, for controlling $NO_x$ levels 3 in a natural gas-fired combustion source like a package boiler 18 such as the one shown in FIG. 4. The control system 2 utilizes a programmable loop commander/master controller (PLC) 10 which contains an atomizing steam injection control curve, such as that shown in FIG. 5, which is pre-established for each particular boiler 18 (FIG. 4) which indicates $NO_x$ levels for the boiler 18 based on steam injection rates and fuel flow rates provided to a burner 16.

The fuel provided to the burners 16 (FIG. 4) are monitored with a fuel flow transmitter 8 which measures the fuel flow to the burner 16 and transmits a signal 9 corresponding to the measured fuel flow rate. The fuel flow signal 9 is transmitted to the PLC 10 as shown in FIG. 1.

$NO_x$ levels are determined for a particular boiler 18 by knowing the fuel flow rate 8 and the atomizing steam injection flow rate 6 for the boiler 18. Boiler atomizing steam injection flow monitor 6 measures the boiler atomizing steam injection flow rates and transmits a boiler atomizing steam injection flow signal 7 to the PLC 10.

A recorder 15, as shown in FIG. 1, is used to record the boiler atomizing steam injection flow signal 7, the fuel flow signal 9, $NO_x$ levels signal 3, and boiler pressure signal 11.

Figure 5:
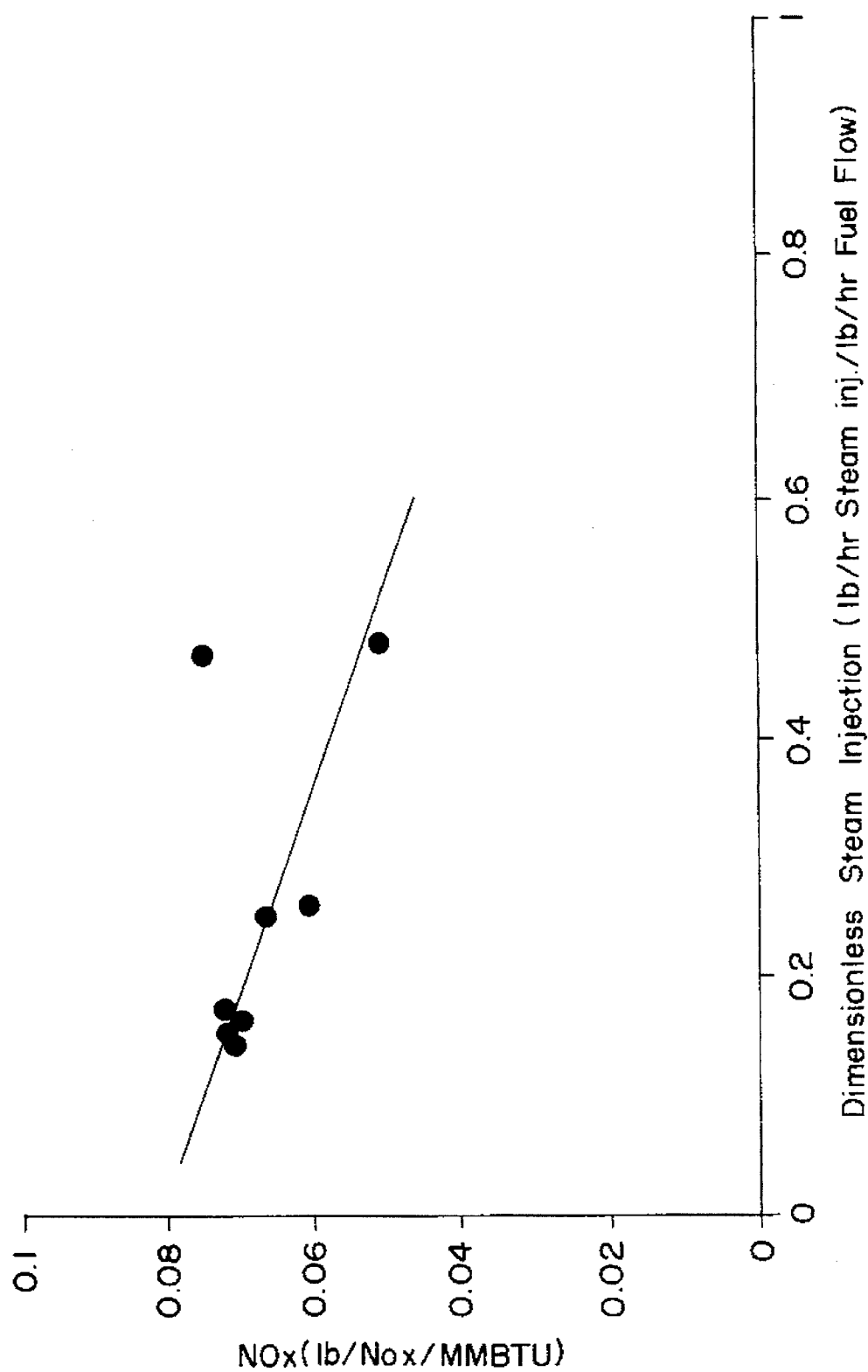
FIG. 5 is a graph illustrating an atomizing steam injection control curve according to the present invention.

The $NO_x$ PLC controller 10 determines the boiler atomizing steam flow rate 7 by comparing the fuel flow rate 9, the atomizing steam injection flow rate signal 7, the $NO_x$ levels signal 3, and boiler pressure signal 11 obtained from the existing atomizing steam injection flow transmitter 6, the fuel flow rate signal 9 provided by the existing fuel flow transmitter 8, the $NO_x$ meter 4, and boiler pressure transmitter 5. Based on the atomizing steam injection flow rate, the fuel flow rate, steam pressure, and the firing rate, the $NO_x$ level for the boiler 18 is determined by PLC 10. The term "firing rate" as used herein is meant to include change of load with time with load referring to steam flow. By utilizing the pre-programmed control curve (FIG. 5) which is loaded in the $NO_x$ PLC controller 10, $NO_x$ emissions of the boiler 18 are reduced by the following process. The PLC controller 10 outputs a signal to an atomizing steam characterizable control valve 14 connected to a steam source which is operatively connected to the PLC controller 10 through a converter 12. The PLC controller 10 provides the output signal to the converter 12, which is in turn, converted into a drive signal which is provided to atomizing steam characterizable meter valve 14 which causes atomizing steam to be provided to the burners 16 in accordance with the pre-programmed loading curve (FIG. 5). The loading curve is developed using test instrumentation which measures $NO_x$.

Figure 2:
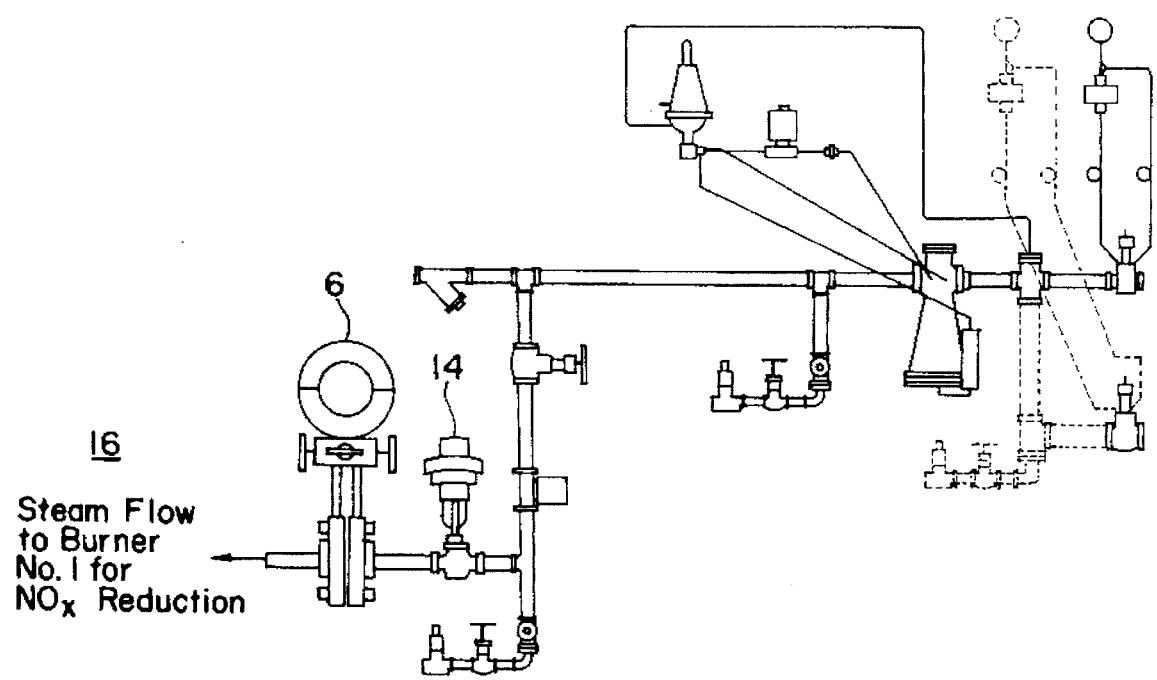
FIG. 2 is a schematic view illustrating an atomizing steam injection valve arrangement for one burner according to the present invention.
Figure 3:
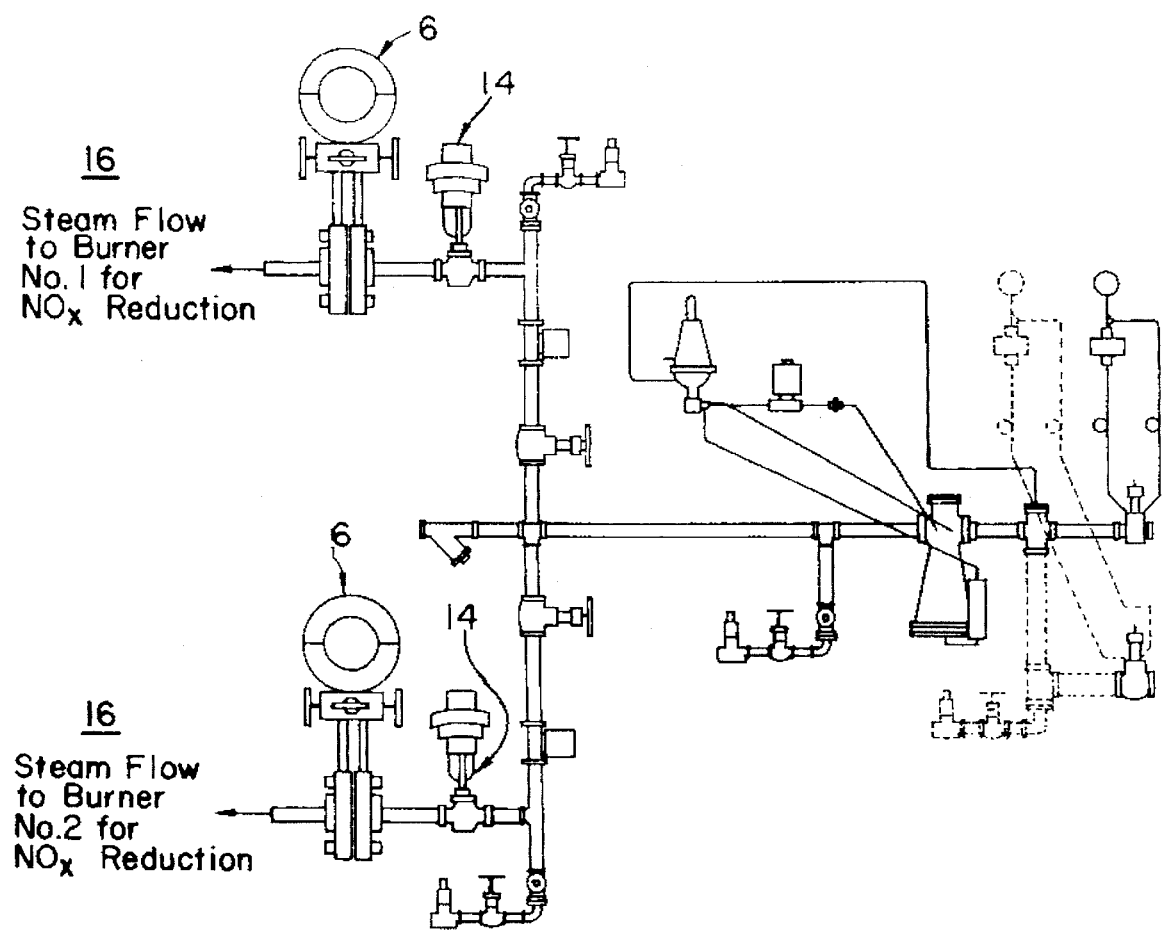
FIG. 3 is a schematic view illustrating an atomizing steam injection valve arrangement for two burners according to the present invention.

As shown in FIGS. 2 and 3, atomizing steam is provided through a valve arrangement 14 to a single gas burner 16 (FIG. 2) or a plurality of gas burners 16, such as a dual gas burner, as shown in FIG. 3.

As illustrated in FIG. 6, test results of the method according to the present invention, have shown a 20% to 25% reduction in $NO_x$ emissions through the use of atomizing steam injection from baseline testing.

Figure 7A:
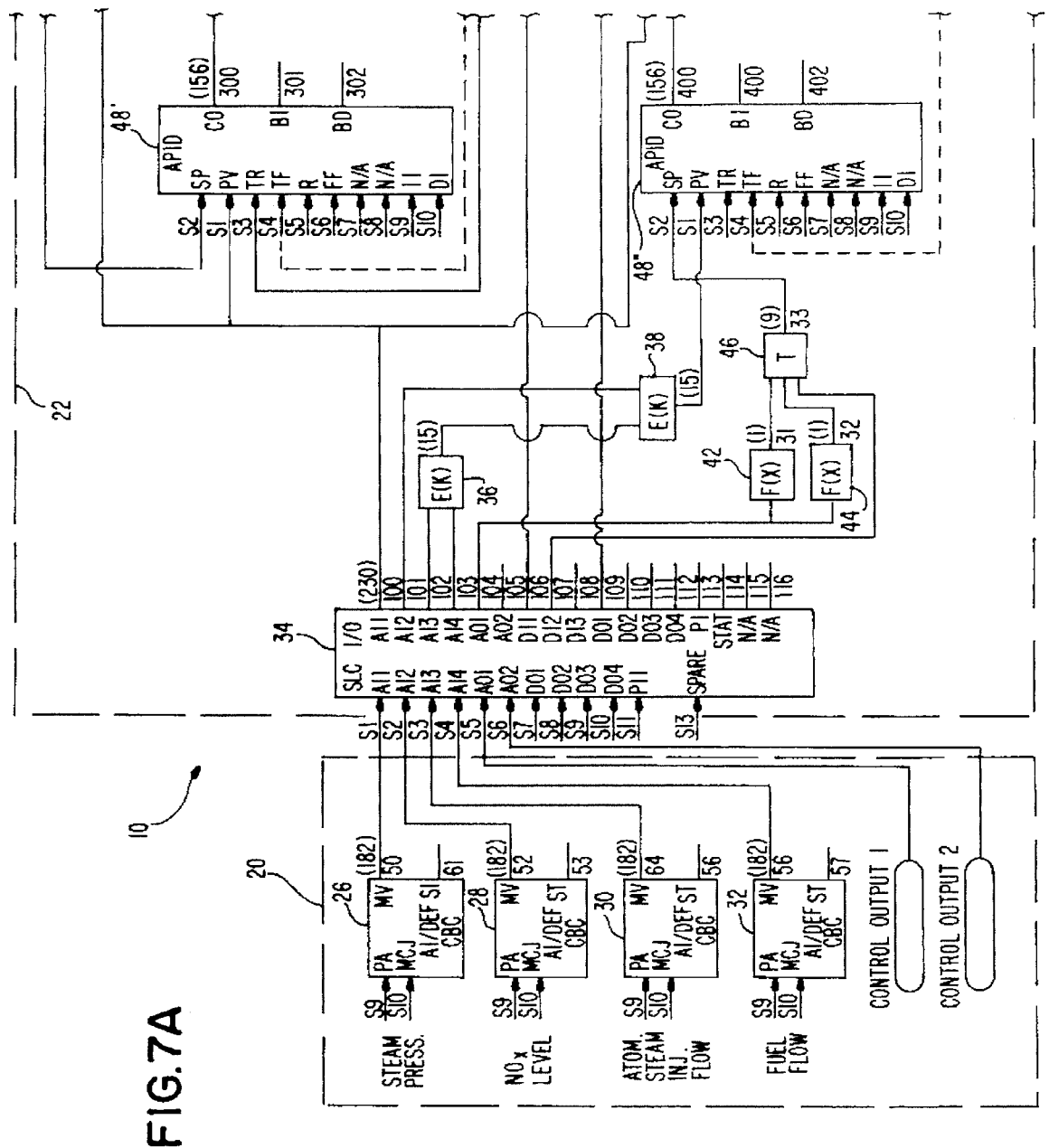
FIGS. 7A and 7B is a schematic of PLC 10.
Figure 7B:
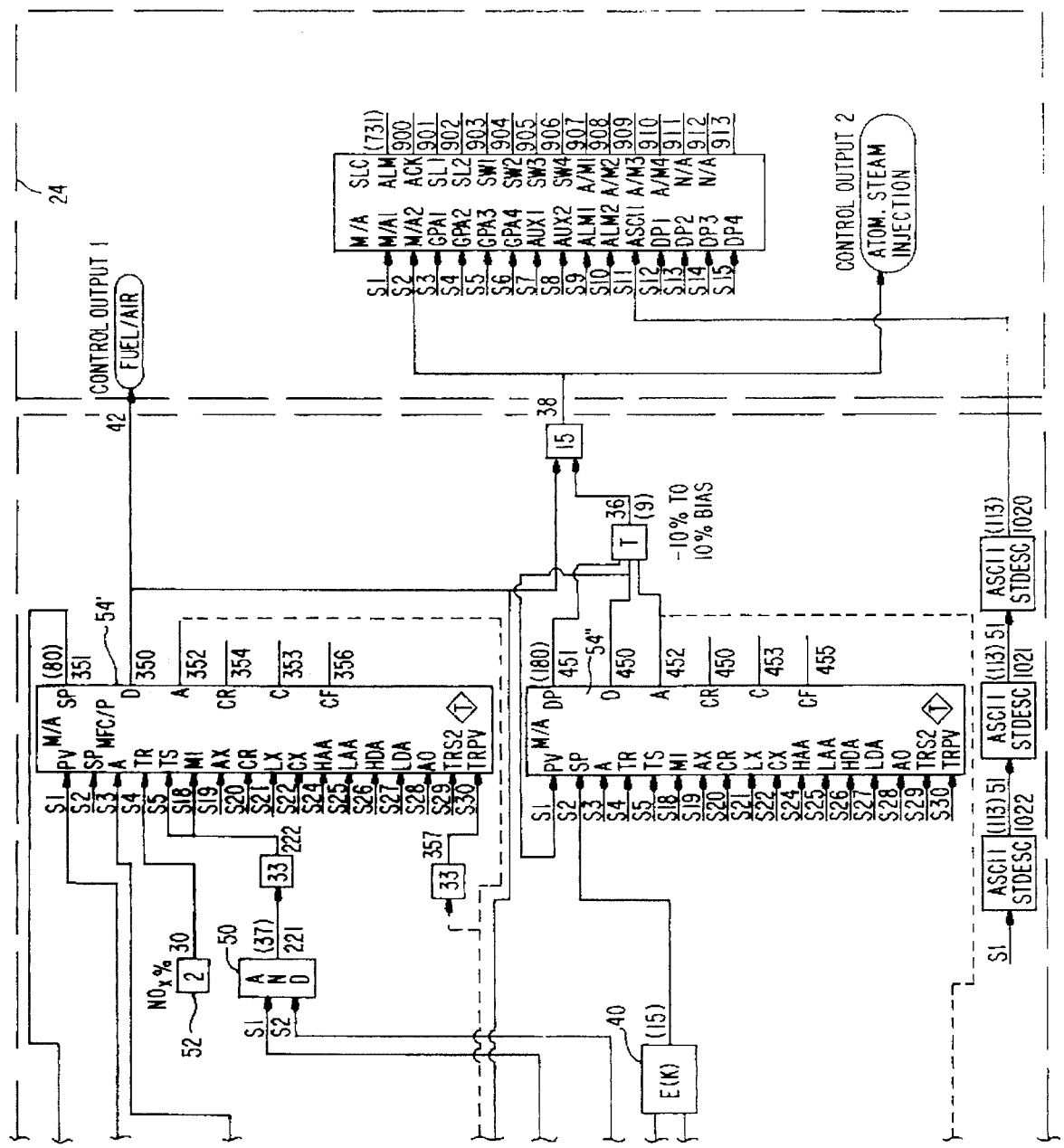

Referring to FIG. 7, there is shown a schematic of the preferred embodiment of PLC 10. PLC 10 is a controller like a Bailey Controls Co. strategic loop controller type SLC with modifications in the logic as set forth herein. PLC 10 comprises an input signal section 20, a logic section 22, and an output signal section 24.

Figure 8:
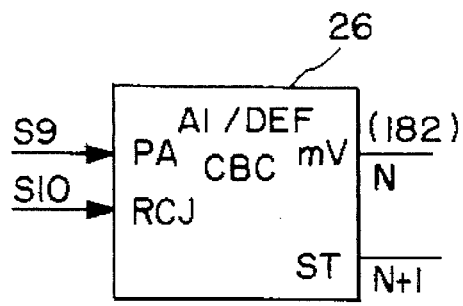
FIG. 8 shows one analog input definition function used in FIG. 7.

FIG. 8 shows one component 26 from the input signal section 20 FIG. 7. The analog input definition function code defines the input type, for example steam pressure 26, $NO_x$ level 28, atomizing steam injection flow 30 and fuel flow 32 and the engineering units for the batch command controller (CBC). This function code outputs the input voltage and its status. The analog input definition function code allows the solution of a square root or polynomial function. This function can be applied to a reading before or after conversion to the engineering units. Also shown in the input signal section are two control outputs which may be optionally used for other purposes.

Figure 9:
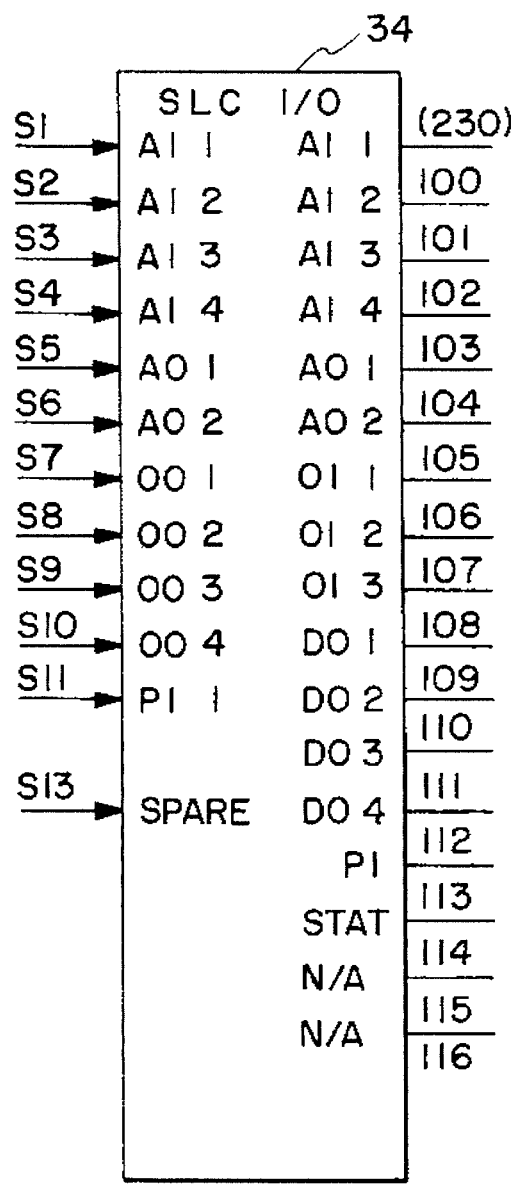
FIG. 9 shows a strategic loop controller I/O used in FIG. 7.

FIG. 9 illustrates the strategic loop controller 34 I/O—FC230 of the logic section 22. The strategic loop controller 34 input and output (SLC I/O) function code provides the interface between the control configuration and the SLC 01 strategic loop controller I/O hardware. Function code 20 is stored in fixed block 100 and uses 17 block addresses (blocks 100 through 116). The SLC I/O function block has four analog inputs, three digital inputs, one pulse input, two analog outputs and four digital outputs. In the present invention, controller 34 receives and process the input signals from section 20.

Figure 10:
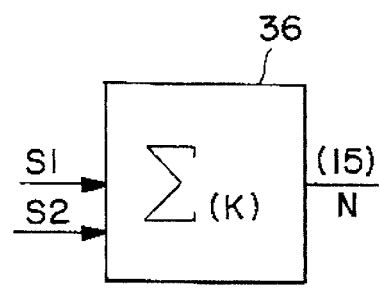
FIG. 10 shows a two input summer FC15 used in the logic of FIG. 7.

FIG. 10 is a two input summer 36—FC 15. This function performs a weighted sum of two inputs atomizing steam injection flow rate and fuel flow rate. By choosing the proper gain and inputs this block can perform proportional, bias or difference functions. It also can be used as a scaler for non-zero based signals by referencing the second input to a constant block. Summers 38 and 40 are used in conjunction with summer 36 to condition the analog inputs from the input signal section 20.

Figure 11:
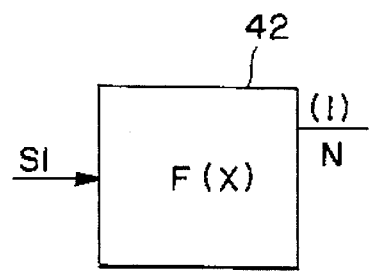
FIG. 11 shows a function generator FC1 used in the logic of FIG. 7.

FIG. 11 shows a function generator 42—FC 1. This function approximates a non-linear output to input relationship. The input range is divided into five sections and linear input to output relationship is set up for each of the five sections. This function then computes an output that is related to the input according to the five linear relationships which are used as a five point $NO_x$ control curve. Function block 42 generates a theoretical curve based on steam injection for natural gas. Optionally, function block 44 is provided to generate a theoretical curve for an alternate fuel such as oil.

Figure 12:
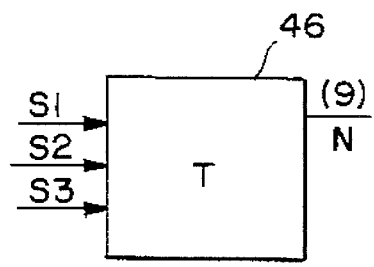
FIG. 12 shows an analog transfer FC9 used in the logic of FIG. 7.

FIG. 12 shows an analog transfer function block 46—FC 9. This function selects one of two inputs depending on Boolean input. The output of analog transfer function block 46 equals the input determined by the state of input according to Boolean logic. There are two time constants to provide smooth transfer in both directions.

Figure 13:
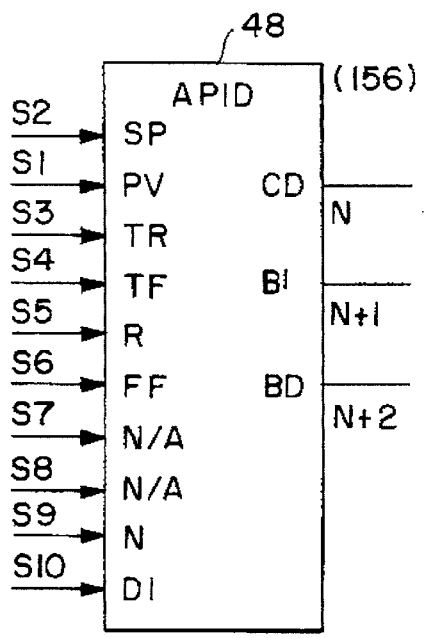
FIG. 13 shows an advanced PID controller FC156 used in the logic of FIG. 7.

FIG. 13 shows an advanced PID controller 48—FC 156. The advanced PID controller function code implements a Proportional Integral Derivative controller. Some of the advance features of the advanced PID controllers are: 1) direct incorporation of a feedforward signal into a PID controller; 2) algorithm for derivative action calculation and for incorporating an external reset or manual reset signal; 3) Control output increase and decrease inhibit signals to constrain controllers in cascade configurations when limits are encountered. This prevents the master loop from wind-up when the slave loop control output saturates; 4) Bumpless manual-to-auto transfer; 5) Bumpless proportional band turning; 6) reverse acting or direct acting direction switch; 7) set point modifier option allowing bumpless set point changes. PID controller 48' controls operation of the boiler which includes firing rate and PID controller 48" controls $NO_x$ trim, i.e., deviation from norm or expected.

Figure 14:
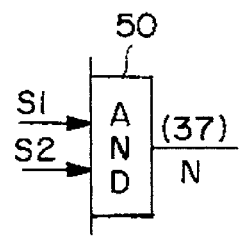
FIG. 14 shows a two input AND FC37 used in the logic of FIG. 7.

FIG. 14 shows a two input AND 50—FC37. The two input AND function code performs the logical AND function. The output is logic 1 when both inputs are logic 1. Optional $NO_x$ input 52 tracks and displays $NO_x$ levels.

Figure 15:
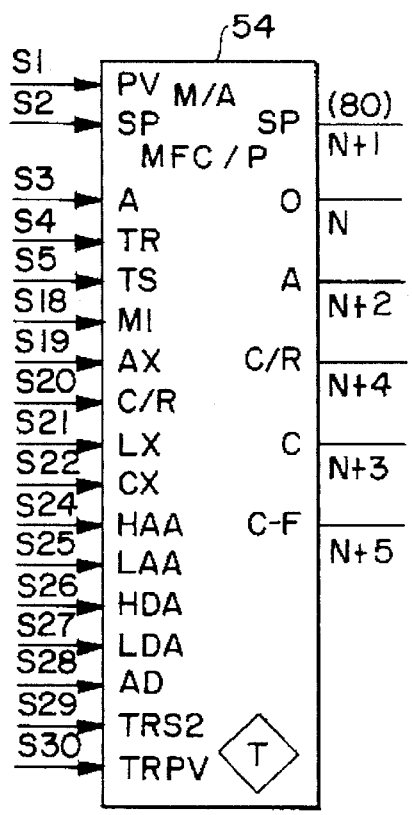
FIG. 15 shows control station FC80 used in the logic of FIG. 7.

FIG. 15 shows a control station 54—FC 80. The basic control station generates a set point (SP) and provides manual/automatic transfers, control output adjustment in manual control mode. This station is controllable through a digital or analog control station or a console such as the operator interface station (OIS).

Station control allows changing the mode, set point, ratio index and control output of a control station by manipulating a control station element.

The control output (CO) value during start-up is configurable.

If a communication failure exists for the station, then the control output tracks the CO track signal during start-up.

Control station 54' controls the boiler operation functions and control station 54" controls the actual $NO_x$ trim.

One advantage of the present invention is that there may no longer be a need to replace conventional gas burners with low $NO_x$ gas burners in order to meet current government regulations regarding $NO_x$ emissions. This results in a cost savings of a factor of ten when compared to the cost involved with installing low $NO_x$ burners.

While specific embodiments of the invention have been shown and described in detail to illustrate the application of the principles of the invention, it will be understood that the invention may be embodied otherwise without departing from such principles.

What is claimed is:

1. An apparatus for controlling $NO_x$, comprising:

means for establishing a control curve for a combustion source indicating $NO_x$ levels based oh atomizing steam injection flow rates, firing rates, and fuel flow rates provided to at least one burner of the combustion source;

means for measuring combustion source firing rate and establishing a signal indicative thereof;

means for measuring atomizing steam injection flow rate to each burner and establishing a signal indicative thereof;

means for measuring fuel flow rate to each burner and establishing a signal indicative thereof;

means for measuring $NO_x$ level at the combustion source flue gas outlet and establishing a signal indicative thereof;

means for determining a $NO_x$ level for the combustion source based on the fuel flow rate signal, atomizing steam injection flow rate signal, the measured $NO_x$ level signal, and the combustion source firing rate signal; and means for adding atomized steam to each burner in communication with and responsive to said determining means to lower the $NO_x$ level according to the control curve.

2. An apparatus according to claim 1, wherein said combustion source includes a boiler.

3. An apparatus according to claim 2, wherein the means for measuring combustion source firing rate comprises means for measuring boiler steam pressure and establishing a signal indicative thereof.

4. An apparatus according to claim 3, wherein said boiler is a package boiler.

5. An apparatus according to claim 1, further comprising a recorder for displaying measured values.

6. An apparatus according to claim 1, wherein said determining means comprises a programmable loop commander master controller.

7. An apparatus according to claim 6, wherein said adding means comprises a control valve operatively connected to said programmable loop commander master controller and a steam source for supplying atomizing steam responsive to an output signal.

* * * * *